United States Patent
Xie et al.

(10) Patent No.: US 11,231,957 B2
(45) Date of Patent: Jan. 25, 2022

(54) PERFORMING PARALLEL EXECUTION OF TRANSACTIONS IN A DISTRIBUTED LEDGER SYSTEM

(71) Applicant: Advanced New Technologies Co., Ltd., Grand Cayman (KY)

(72) Inventors: Guilu Xie, Hangzhou (CN); Ning Xia, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/668,937

(22) Filed: Oct. 30, 2019

(65) Prior Publication Data

US 2020/0326973 A1     Oct. 15, 2020

Related U.S. Application Data

(63) Continuation of application No. PCT/CN2019/082558, filed on Apr. 12, 2019.

(51) Int. Cl.
*G06F 9/46* (2006.01)
*G06F 16/23* (2019.01)

(52) U.S. Cl.
CPC .......... *G06F 9/466* (2013.01); *G06F 16/2365* (2019.01); *G06F 16/2379* (2019.01)

(58) Field of Classification Search
CPC ....................................................... G06F 9/466
USPC ........................................................ 718/101
See application file for complete search history.

(56) References Cited

U.S. PATENT DOCUMENTS

| | | | |
|---|---|---|---|
| 9,594,644 B2 * | 3/2017 | Abouzour | G06F 9/5038 |
| 10,255,108 B2 * | 4/2019 | Dillenberger | G06F 9/5038 |
| 2010/0287554 A1 * | 11/2010 | Amundsen | G06F 9/5038 |
| | | | 718/101 |
| 2016/0350749 A1 | 12/2016 | Wilkins et al. | |
| 2017/0212781 A1 * | 7/2017 | Dillenberger | G06F 9/5038 |
| 2018/0096360 A1 * | 4/2018 | Christidis | H04L 9/3239 |
| 2018/0158034 A1 * | 6/2018 | Hunt | G06Q 20/00 |
| 2018/0276668 A1 * | 9/2018 | Li | G06O 20/3825 |

(Continued)

FOREIGN PATENT DOCUMENTS

| | | |
|---|---|---|
| CN | 106980649 | 7/2017 |
| CN | 107402824 | 11/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mehran Kamran
(74) *Attorney, Agent, or Firm* — Fish & Richardson P.C.

(57) ABSTRACT

Disclosed herein are methods, systems, and apparatus, including computer programs encoded on computer storage media, for performing parallel execution of transactions by a network node in a blockchain network. One of the methods includes receiving multiple transactions, grouping all first-type transactions in the multiple transactions into a group of first-type transactions, dividing the group of first-type transactions into one or more subgroups, and executing the group of first-type transactions by executing the one or more subgroups of the group of first-type transactions in parallel.

24 Claims, 6 Drawing Sheets

(56) References Cited

U.S. PATENT DOCUMENTS

| | | | |
|---|---|---|---|
| 2019/0018984 A1* | 1/2019 | Setty | H04L 63/123 |
| 2019/0044714 A1* | 2/2019 | Parker | H04L 9/3239 |
| 2019/0058580 A1* | 2/2019 | Tormasov | G06F 9/466 |
| 2019/0081793 A1 | 3/2019 | Martino et al. | |
| 2019/0087446 A1* | 3/2019 | Sharma | G06Q 20/382 |
| 2019/0087793 A1* | 3/2019 | Dickerson | G06Q 20/0658 |
| 2019/0087893 A1 | 3/2019 | Pellew | |
| 2019/0108498 A1* | 4/2019 | Deshpande | H04L 9/3239 |
| 2019/0108518 A1 | 4/2019 | Asif et al. | |
| 2019/0149600 A1 | 5/2019 | Duan et al. | |
| 2019/0188711 A1* | 6/2019 | Wu | G06Q 20/065 |
| 2019/0236298 A1 | 8/2019 | Agarwal | |
| 2019/0236598 A1* | 8/2019 | Padmanabhan | G06Q 20/0655 |
| 2019/0238316 A1* | 8/2019 | Padmanabhan | H04L 9/3239 |
| 2019/0244207 A1* | 8/2019 | Samuel | G06Q 20/065 |
| 2019/0281065 A1* | 9/2019 | Xia | H04L 63/102 |
| 2019/0287082 A1* | 9/2019 | Song | G06Q 20/02 |
| 2019/0287101 A1* | 9/2019 | Xia | H04L 9/00 |
| 2019/0334715 A1 | 10/2019 | Gray | |
| 2019/0334726 A1 | 10/2019 | Kelly | |
| 2019/0334920 A1 | 10/2019 | Kelly | |
| 2019/0340269 A1 | 11/2019 | Biernat et al. | |
| 2019/0354397 A1* | 11/2019 | Goel | G06F 9/4881 |
| 2019/0361731 A1* | 11/2019 | Qiu | G06F 16/27 |
| 2019/0362423 A1* | 11/2019 | Hosman | H04L 67/42 |
| 2019/0363873 A1 | 11/2019 | Fry et al. | |
| 2019/0386995 A1* | 12/2019 | Chafe | H04L 63/10 |
| 2020/0005255 A1 | 1/2020 | Wu | |
| 2020/0013025 A1 | 1/2020 | Verma et al. | |
| 2020/0021602 A1 | 1/2020 | Irazabal | |
| 2020/0034448 A1 | 1/2020 | Sato et al. | |
| 2020/0034453 A1 | 1/2020 | Sato et al. | |
| 2020/0034469 A1 | 1/2020 | Sato et al. | |
| 2020/0044824 A1 | 2/2020 | Xie et al. | |
| 2020/0052884 A1 | 2/2020 | Tong et al. | |
| 2020/0167741 A1 | 5/2020 | Gamaroff et al. | |
| 2020/0210402 A1 | 7/2020 | Hu et al. | |

FOREIGN PATENT DOCUMENTS

| | | |
|---|---|---|
| CN | 107451175 | 12/2017 |
| CN | 107678865 | 2/2018 |
| CN | 108269072 | 7/2018 |
| CN | 109559226 | 4/2019 |
| EP | 3566391 | 11/2019 |
| WO | WO 2018157778 | 9/2018 |
| WO | WO 2018207064 | 11/2018 |
| WO | WO 2019043536 | 3/2019 |
| WO | WO 2019072305 | 4/2019 |

OTHER PUBLICATIONS

Nakamoto, "Bitcoin: A Peer-to-Peer Electronic Cash System," www.bitcoin.org, 2005, 9 pages.

Extended European Search Report in European Application No. 19732237.3, dated Mar. 20, 2020, 8 pages.

PCT International Search Report and Written Opinion in International Application No. PCT/CN2019/082558, dated Jan. 14, 2020, 7 pages.

Anjana et al., "An Efficient Framework for Optimistic Concurrent Execution of Smart Contracts," arXiv:1809.01326v4, Sep. 2018, 16 pages.

Dickerson et al., "Adding Concurrency to Smart Contracts," Principles of Distributed Computing, Jul. 2017, pp. 303-312.

Extended European Search Report in European Application No. 19732228.2, dated Apr. 8, 2020, 9 pages.

PCT International Search Report and Written Opinion in International Application No. PCT/CN2019/082564, dated Jan. 14, 2020, 7 pages.

U.S. Appl. No. 16/670,587, filed Oct. 31, 2019, Guilu Xie.

Kalthoff, "Scheduling of parallel processing systems based on algorithmic skeletons," Proceedings of PDSE '97: 2nd International Workshop on Software Engineering for Parallel and Distributed Systems, May 1997, pp. 234-242.

Aelf.io [online], "A Multi-Chain Parallel Computing Blockchain Framework," Jun. 7, 2018, retrieved on May 14, 2021, retrieved from URL <https://aelf.io/gridcn/aelf_whitepaper_EN.pdf?v=1.6>, 34 pages.

* cited by examiner

US 11,231,957 B2

PERFORMING PARALLEL EXECUTION OF TRANSACTIONS IN A DISTRIBUTED LEDGER SYSTEM

CROSS-REFERENCE TO RELATED APPLICATIONS

This application is a continuation of PCT Application No. PCT/CN2019/082558, filed on Apr. 12, 2019, which is hereby incorporated by reference in its entirety.

TECHNICAL FIELD

This specification relates to transaction execution in a distributed ledger system.

BACKGROUND

Distributed ledger systems (DLSs), which can also be referred to as consensus networks, for example, blockchain networks, enable participating entities to securely, and immutably store data. Examples of blockchain networks can include: public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

A blockchain network is a network of computing nodes that manage, update, and maintain one or more blockchain structures. A blockchain is a data structure that stores transactions in a way that allows future transactions to be verified for consistency with all prior transactions stored in the chain. The transactions are executed and recorded in the blockchain by each of the network nodes of the blockchain network.

One issue encountered in blockchain networks is the speed at which transactions are processed. Generally, network nodes in the blockchain network process transactions serially in the order they are submitted. This can lead to low transaction throughput and delays between when a transaction is submitted and when it clears.

Although multiple existing techniques can be used for executing the transactions among the network nodes of a blockchain system, a more efficient solution to executing the transactions would be advantageous.

SUMMARY

This specification describes technologies for performing transaction execution in a distributed ledger system (e.g., a blockchain network). These technologies generally involve performing parallel execution of transactions by a network node in a distributed ledger system. The described techniques can, for example, improve processing speed of multiple transactions in a blockchain network and increase transaction throughput of the blockchain network.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Figure 1:
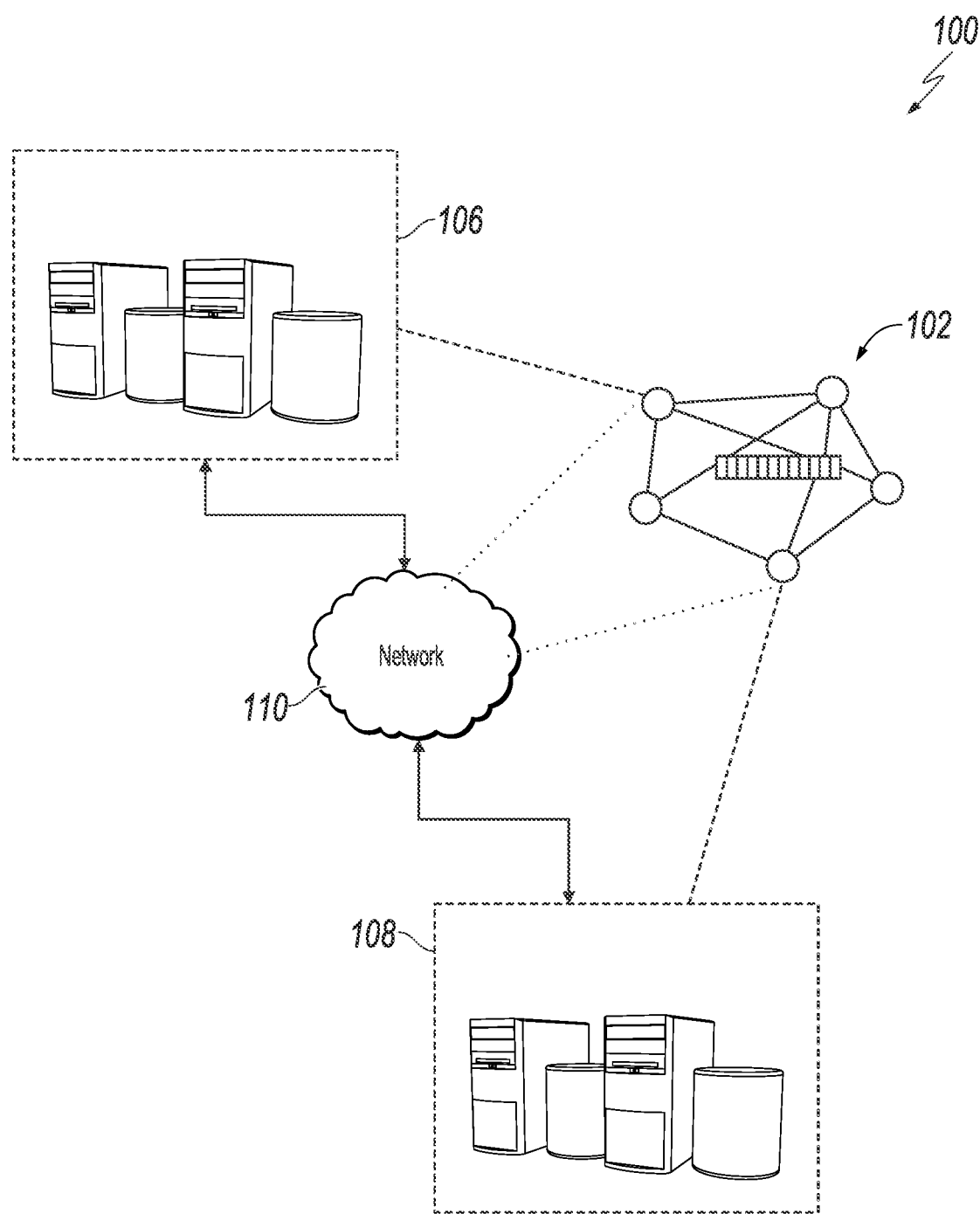
FIG. 1 depicts an example of an environment that can be used to execute embodiments of the specification.

This specification describes technologies for transaction execution in a distributed ledger system (e.g., a blockchain network). These technologies generally involve performing parallel execution of transactions by a network node in a distributed ledger system. The described technologies can improve processing speed of transactions in a blockchain network and increase transaction throughput of the blockchain network.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including multiple computers interconnected by a network and functioning as a distributed processing system.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
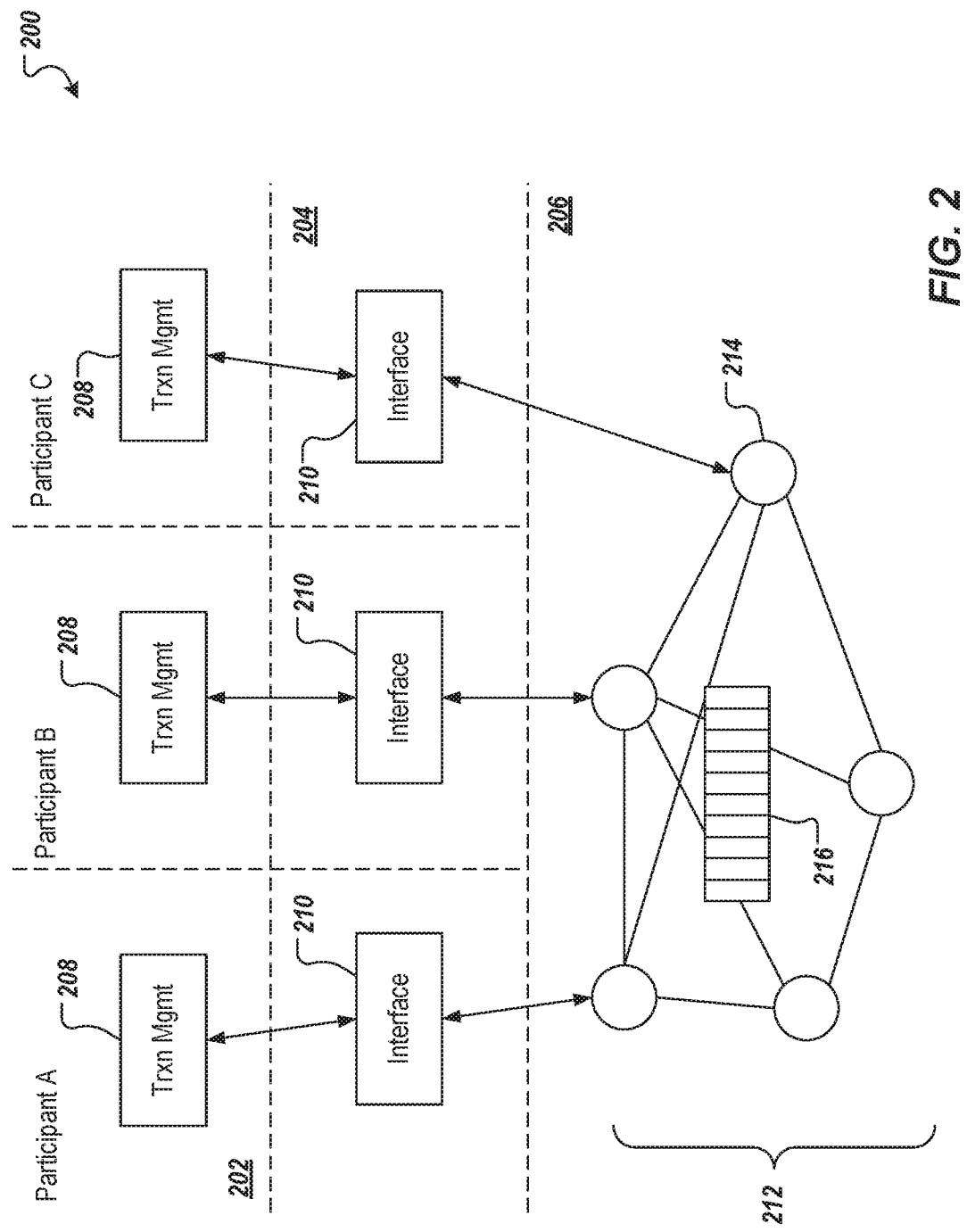
FIG. 2 depicts an example of an architecture in accordance with embodiments of the specification.

FIG. 2 depicts an example of an architecture 200 in accordance with embodiments of this specification. The example of the architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including multiple nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

As described above, a blockchain network enables participants to conduct transactions, for example, to buy/sell goods, and/or services. In some embodiments, each participant is associated with one or more accounts. A transaction can involve one or more participants and execution of the transactions may affect one or more accounts of the one or more participants. As an example, a fund transfer transaction from Participant A to Participant B can result in a decrease of fund in Account A of Participant A and an increase of fund in Account B of Participant B.

In some embodiments, record-keeping models are used to record transactions and the corresponding accounts between participants. Example record-keeping models include an unspent transaction output (UTXO) model, and account model (also referred to as account-based model or account/balance model).

In the UTXO model, the assets on the chain are in the form of transactions. Each transaction spends output from prior transactions and generates new outputs that can be spent in subsequent transactions. A participant's unspent transactions are tracked, and a balance that the participants has to spend is calculated as the sum of the unspent transactions. Each transaction takes one or more unspent outputs (and only unspent outputs) as input and can have one or more outputs. The requirement that only unspent outputs may be used in further transactions is necessary to prevent double spending and fraud.

The account model performs record-keeping and manages account balances like a traditional bank. Under this model, an account can have an address and a corresponding account balance. Assets on the chain are represented as the balance of the account. Each transfer transaction can have an account address of a transferred asset and an account address of a received asset. The transaction amount is directly updated on the balance of the account. The account model is efficient as each transaction may only need to validate that the sending account has enough balance to pay for the transaction. In addition to supporting the transaction validation and proof function, the account model can fully support smart contracts, especially those that require state information or involve multiple parties.

In some embodiments, a transaction includes a message packet sent by an external account to another account on the blockchain. The transaction may include a sender's signature, a recipient's address, and a token that the sender transfers to the recipient. The transaction may also include information about a smart contract. Every transaction can be a record on the blockchain.

In some embodiments, a smart contract is a computer program designed to disseminate, verify, and/or execute a contract by a data processing system, e.g., a blockchain consensus network. Smart contracts allow for trusted transactions without participation of a third party. The transactions are traceable and irreversible.

In some embodiments, transactions in the blockchain system may include multiple types such as transfers, contract deployments, contract calls, contract updates, deposits, etc. In some embodiments, regardless of the type of transaction, a transaction can includes a sender, a recipient, an amount of the transfer, data required for the contract, a hash of the transaction, and a signature.

In some embodiments, a transaction can be categorized as a first-type transaction or a second-type transaction depending on whether one or more accounts affected by execution of the transaction can be pre-determined or ascertained before the execution of the transaction. For the first-type transaction, one or more accounts affected by execution of the first-type transaction can be pre-determined before the execution of the first-type transaction. Examples of the first-type transaction can include a fund transfer transaction as described above, where the accounts (e.g., Account A of Participant A and Account B of Participant B) affected by the fund transfer transaction can be determined before the execution of the fund transfer transaction between Participant A and Participant B.

For the second-type transaction, one or more accounts affected by execution of the second-type transaction cannot be pre-determined or ascertained before the execution of the second-type transaction. Examples of the second-type transaction can include a smart contract transaction such as a call of a smart contract. A smart contract transaction can involve one or more participants in execution of a smart contract. The accounts affected by the execution of the smart contract transaction may depend on a current state of the blockchain at the time of execution, and thus cannot be ascertained before the execution of the smart contract transaction. As such, two or more smart contract transactions may not be executed in parallel. Because a smart contract call can lead to the execution of instructions making up the smart contract, it may not be possible to determine the scope of accounts a particular contract call will affect. For example, consider a smart contract that takes a particular account and a payment amount as parameters, and applies the payment amount to the particular account if some condition is true. Because a caller of this smart contract specifies the particular account and the condition depends on the state of the blockchain when the smart contract is executed, it may not be possible to ascertain, from the definition of the smart contract itself (e.g., its source code), which accounts a particular call to the smart contract will affect. In some embodiments, the contract call may be a transaction with the potential to affect all accounts in the blockchain network. Therefore the contract call cannot be executed in parallel with any other transactions.

Figure 3A:
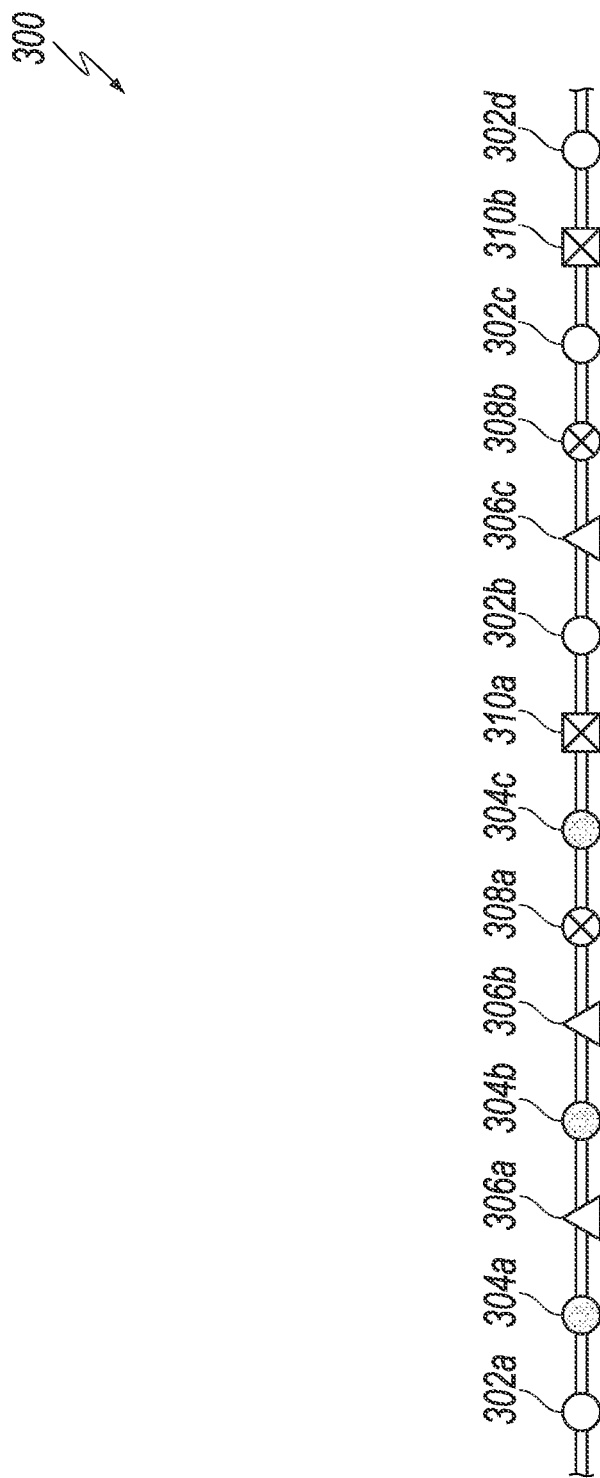
FIG. 3A depicts an example of an execution order for transactions in a blockchain network in accordance with embodiments of the specification.

To provide further context for embodiments of the specification, FIG. 3A depicts an example of an execution order 300 for transactions in a blockchain network in accordance with embodiments of the specification. As shown, the execution order 300 includes multiple transactions (302a-d, 304a-c, 306a-c, 308a-b, and 310a-b) sequenced according to the order in which they are to be executed by network nodes of a blockchain network. The execution order 300 is a serial execution order where each individual transaction is executed one by one. The execution order 300 can be the same execution order among all consensus nodes (e.g., network nodes that participate in a consensus protocol) of a blockchain network. For example, the execution order 300 can be an agreed execution order of the multiple transactions after a consensus process performed by all consensus nodes of the blockchain network. The serial execution order 300 can be used to ensure that the final execution results of different blockchain nodes are consistent.

In some embodiments, each of the multiple transactions includes a first-type transaction or a second-type transaction. In some embodiments, the first-type transaction includes a non-smart-contract transaction, and the second-type transaction includes a smart contract transaction. For example, the first-type transaction may be a fund transfer transaction involving two participants or an account creation transaction for a participant, and the second-type transaction may be a call to execute a smart contract.

As shown in FIG. 3A, each of the transactions 302a-d, 304a-c, 306a-c, and 310a-b includes a first-type transaction such as a non-smart-contract transaction. Each of the transactions 308a and 308b includes a second-type transactions such as a smart contract transaction. In some embodiments, the multiple transactions (302a-d, 304a-c, 306a-c, 308a-b, and 310a-b) can be divided into groups based on the types of the transactions (e.g., depending on whether the accounts affected by the execution of the transaction can be predetermined or not). For example, the first-type transactions 302a-d, 304a-c, 306a-c, and 310a-b can represent a first group of transactions that includes only the first-type transactions, and the second-type transactions 308a and 308b represent a second group of transactions that includes only the second-type transactions.

In some embodiments, multiple first-type transactions may affect one or more common transaction entities (e.g., a transferee or a sender, a transferor or a receiver, or their corresponding accounts) or have dependency, for example, in affecting one or more same or common accounts. In some embodiments, the multiple first-type transactions in the group of first-type transactions can be divided into subgroups based on whether execution of the first-type transactions could affect one or more same accounts. If two or more first-type transactions could affect one or more same accounts, they the two or more first-type transactions may not be executed in parallel at the same time. But the relative execution order between or among the two or more first-type transactions can be determined, for example, according to certain protocol or ordering rules that are used by all the network nodes in the blockchain network.

For example, consider a transaction 302a representing a payment to Account A from Account B in the amount of $300, a transaction 302b representing a payment from Account A to Account C of $50, and a transaction 304a representing a payment from Account D to Account E of $100. The transaction 302a and transaction 302b share a common transaction entity, Account A. As such, the transaction 302a and transaction 302b may not be executed in parallel. The transaction 302a and transaction 302b can be grouped into a same subgroup. On the other hand, because the accounts affected by transaction 304a (Accounts D and E) do not include any of the accounts affected by transactions 302a and 302b (Accounts A, B, and C), transaction 304a has no common transaction entity with transactions 302a and 302b. The transaction 304a can be categorized into a different subgroup from the transaction 302a and transaction 302b. Moreover, the transaction 304a can be executed in parallel with the transactions 302a and 302b.

As such, in some embodiments, the group of first-type transactions can be further divided into two or more subgroups such that, with in a single subgroup, execution of the first-type transactions in the single subgroup affect one or more same accounts (e.g., because the first-type transactions in the single subgroup share a common transaction entity or have dependency); whereas between two different subgroups, one or more accounts affected by execution of the first-type transactions in one subgroup do not overlap with one or more accounts affected by execution of the first-type transactions in the other subgroup. As a result, the first-type transactions in the single subgroup are to be executed in serial, whereas the first-type transactions in the different subgroups can be executed in parallel. In some embodiments, as long as each network node divide the groups and subgroups in the same way, and the execution order of transactions within the group and subgroup is the same, a consistent final execution result of each node can be ensured.

Figure 3B:
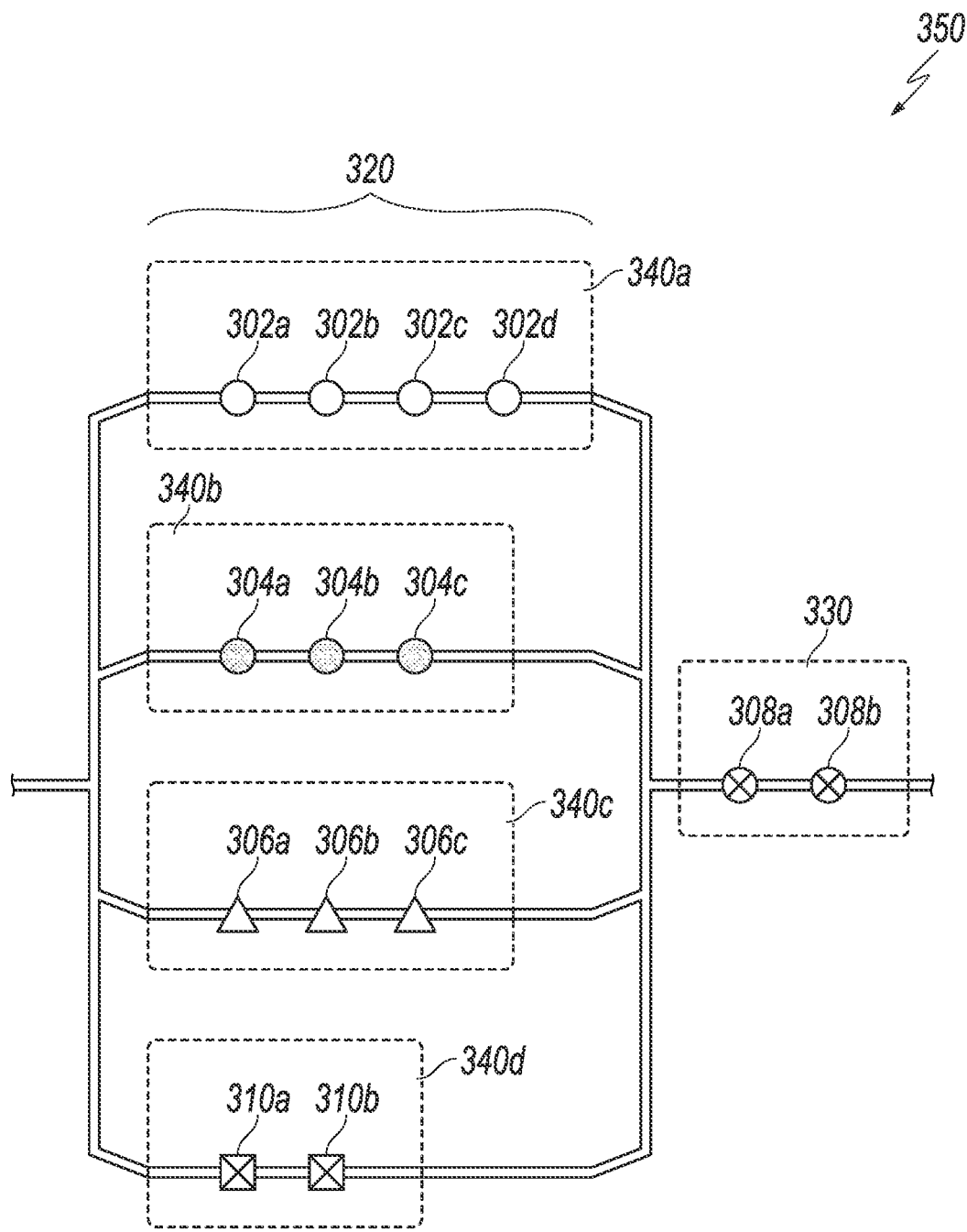
FIG. 3B depicts an example of an execution order for transactions in a blockchain network in accordance with embodiments of the specification.

For example, as shown in FIG. 3B, transactions 302a, 302b, 302c, and 302d represent a first subgroup 340a of the group of first-type transactions that share a first common transaction entity; transactions 304a-c represent a second subgroup 340b of the group of first-type transactions that share a second common transaction entity; transactions 306a-c represent a third subgroup 340c of the group of first-type transactions that share a third common transaction entity; and transactions 310a-b represent a fourth subgroup 340d of the group of first-type transactions that share a fourth common transaction entity. Between each two of the subgroups 340a, 340b, 340c, and 340d, transactions in one subgroup do not affect a same account as transactions in another subgroup do. As described below with reference to FIG. 3B, the multiple subgroups 340a, 340b, 340c, and 340d of the first-type transactions can be executed in parallel by each network node of the blockchain network according to embodiments of the specification.

FIG. 3B depicts an example of a parallel execution order 350 for transactions in a blockchain network in accordance with embodiments of the specification. As shown in FIG. 3B, in some embodiments, all first-type transactions (e.g., non-smart-contract transactions) out of the total number of transactions 302a-d, 304a-c, 306a-c, 308a-b, and 310a-b are grouped in the group 320, and all the second-type transactions (e.g., smart-contract transactions) out of the total number of transactions 302a-d, 304a-c, 306a-c, 308a-b, and 310a-b are grouped in the group 330. As shown in FIG. 3B, all the first-type transactions in the group 320 are executed before all the second-type transactions in the group 330. In some other embodiments, the relative execution order between the group 320 of the first-type transactions and the group 330 of the second-type transactions can be different, as long as each network node follows a same relative execution order between the groups 320 and 330 to ensure the consistency of the global state of the blockchain network after the execution of the total number of transactions 302a-d, 304a-c, 306a-c, 308a-b, and 310a-b.

In some embodiments, in the parallel execution order 350, within the group 320 of first-type transactions, transactions to be executed serially can be grouped together. For example, as shown in the FIG. 3B, transactions 302a-d are grouped in the subgroup 340a, transactions 304a-c are grouped in the subgroup 340b, transactions 306a-c are grouped in the subgroup 340c, and transaction 310a-b are grouped in the subgroup 340d. The subgroups 340a, 340b, 340c, and 304d can be executed in parallel by the network nodes of the blockchain network. Executing the transaction subgroups 340a, 340b, 340c, and 304d in parallel can leverage multi-core or multi-thread processing power of each network node, and lead to increases in the processing speed and transaction throughput in the blockchain network, as the network is now executing four transactions at any one time in parallel rather than just one if all transactions were executed serially.

In some embodiments, within each of the subgroups 340a-d of the group 320 of first-type transactions, the first-type transactions can be executed serially according to the order of these transactions in the execution order 300 in FIG. 3A. This can ensure the state of the blockchain network (e.g., the account balances) after executing the transactions according to the parallel execution order 350 to be the same as it would be after executing the transactions according to the execution order 300 in FIG. 3A.

Consider the example where Account A has an initial balance of $0 before executing any of the transactions in FIG. 3B, where transaction 302a represents a payment to Account A from Account B in the amount of $300, and transaction 302b represents a payment from Account A to Account C of $50. If the transactions 302a and 302b are executed serially (as originally described in the execution order 300), Account A will first be funded with $300, and then debited by $50, leaving a balance of $250. However, if the transactions 302a and 302b are not executed serially, and transaction 302b is executed before 302a, the Account A will have a balance of $0 when the payment of transaction 302b is executed. Account A will have an insufficient balance to fund the payment in this scenario, which could lead to transaction 302b being rejected by the blockchain network.

In alternative embodiments, the first-type transactions in any of the subgroup 340a-d sharing a common transaction entity can be executed serially according to an execution order that is different from their original execution order, such as the execution order 300 as shown in FIG. 3A. For example, each of the network nodes of the blockchain network can execute the transactions in each subgroup with a same execution order to ensure a same execution result among the network nodes of the blockchain network. The same execution order can be determined, for example, according to a protocol used by the network nodes of the blockchain network (e.g., based on the order or time that the transactions are received, priorities of the transactions, or other criteria).

FIG. 3B also includes the group 330 of smart contract transactions 308a and 308b. For example, smart contract transactions 308a and 308b may be calls to smart contracts. In some embodiments, a smart contract call can represent a synchronization point, where parallel execution converges. For example, the parallel execution of the subgroups 340a, 340b, 340c, and 340d converges when it reaches a smart contract call 308a. At this point, the blockchain network waits until all transactions in the subgroups 340a, 340b, 340c, and 340d have completed execution, and then proceeds with execution of the smart contract call 308a and 308b. Note that the smart contact calls 308a and 308b can be grouped together and can be executed in a different order than their original order in the serial execution order 300. For example, in original serial execution order 300, the contract call 308a is to be executed before executing transaction 304c. In contrary, in the execution order 350, the contract call 308a is to be executed after executing transaction 304c.

Figure 4:
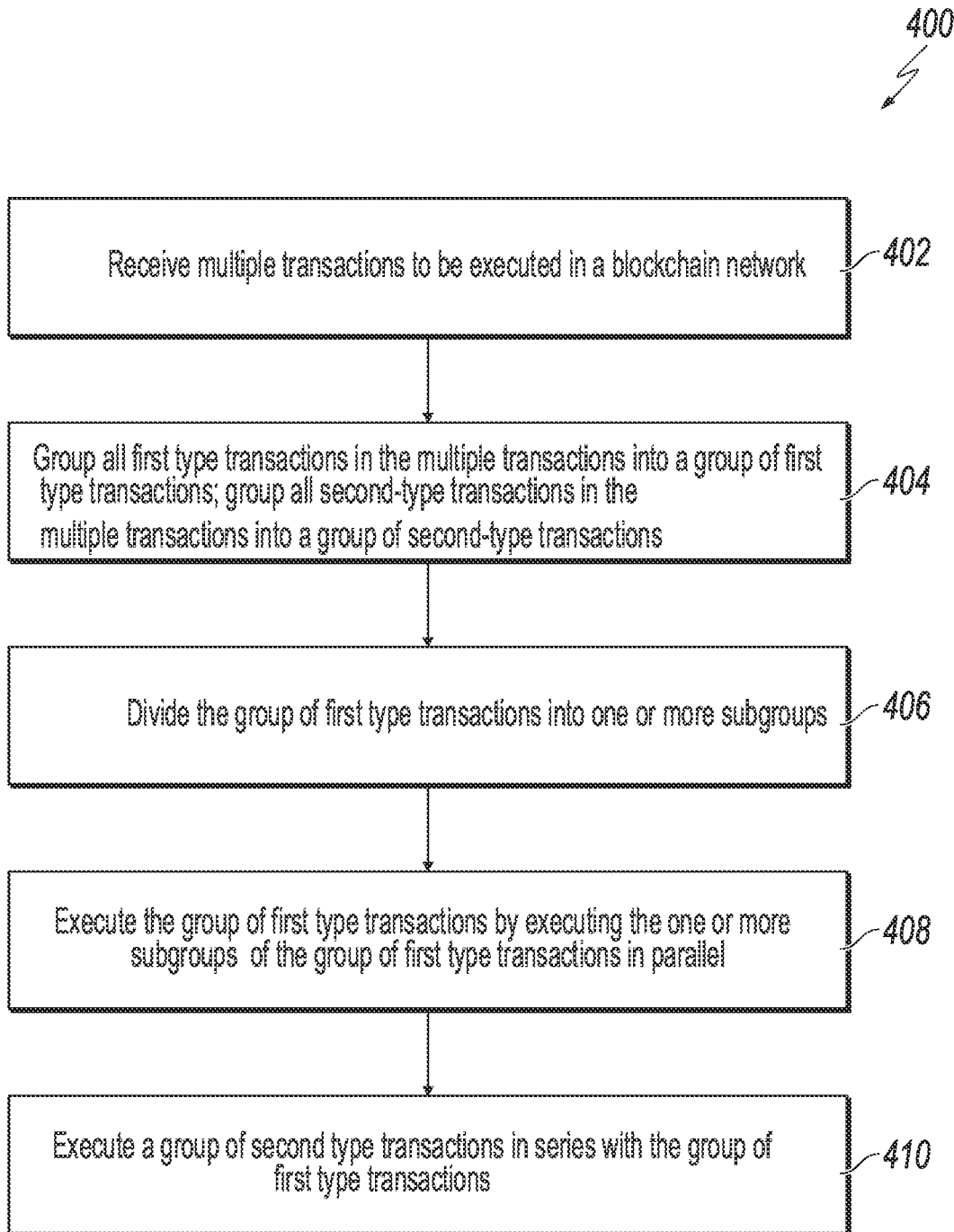
FIG. 4 depicts an example of a process that can be executed in accordance with embodiments of the specification.

FIG. 4 depicts an example of a process 400 that can be executed in accordance with embodiments of the specification. In some embodiments, the process 400 may be performed using one or more computer-executable programs executed using one or more computing devices. For clarity of presentation, the description that follows generally describes method 400 in the context of the other figures in this description. It will be understood that method 400 may be performed, for example, by any suitable system, environment, software, and hardware, or a combination of systems, environments, software, and hardware, as appropriate. In some embodiments, various steps of method 400 can be run in parallel, in combination, in loops, or in any order.

At 402, multiple transactions to be executed in a blockchain network are received at each of multiple network nodes of the blockchain network. In some embodiments, the multiple transactions do not need to be executed by the network node pursuant to a predetermined or mandatory order. In other words, the relative execution order among the multiple transactions are not of essence as long as all the network node in the blockchain network execute the multiple transactions according to a same order.

In some embodiments, each of the multiple transactions include a first-type transaction or a second-type transaction. In some embodiments, the first-type transaction includes a non-smart-contract transaction, and the second-type transaction includes a smart contract transaction. For example, the first-type transaction may be a fund transfer transaction involving two parties, and the second-type transaction may be a call to smart contract. In some examples, the multiple transactions include at least a number of first-type transactions. In some examples, the multiple transactions received at the network nodes of the blockchain network can include multiple first-type transactions and multiple second-type transaction to be executed with an execution order. For example, referring to FIG. 3A, the multiple transactions may include the first-type transactions 302a-d, 304a-c, 306a-c, 310a-b, and the second-type transactions 308a-b to be executed with the execution order 300.

In some embodiments, the multiple transactions include transactions on which a consensus process has been performed by the network nodes of the blockchain network. The multiple transactions may be received during an epoch of a consensus process. In some embodiments, a consensus process or mechanism is designed to achieve reliability in a network involving multiple nodes. For example, a blockchain network relies on consensus mechanisms to reach agreement among network nodes of the blockchain network. An epoch of a consensus represents a round of consensus among the multiple network nodes of the blockchain network. For example, each network node may periodically collect pending transactions and submit their respectively received pending transactions to a consensus process so as to obtain a list of transactions to be executed by each network node in the blockchain network. In some embodiments, the order in which the transactions are received by each node may be different from the order in which the transactions are sent by participants. In some embodiments, the consensus operation of each node on the transaction will further lead to the uncertainty of the transaction order of the list of transactions after the consensus is performed. In some embodiments, each network nodes sort or order the multiple transactions according to certain rules before executing the multiple transactions, and the final execution results of each node can be consistent as long as the ordering rules or protocol of the nodes are the same among the network nodes of the blockchain network.

As an example, the network nodes of the blockchain network as discussed herein may have achieved a consensus for all the multiple transactions to be executed and are ready to execute these transactions according to the serial execution order 300 as shown in FIG. 3A. In some embodiments, before the execution of the transactions and after achieving a consensus, the network nodes of the blockchain network may divide the multiple transactions into multiple subgroups for parallel execution as discussed in greater detail below.

Referring back to FIG. 4, at 404, each of the network nodes groups all first-type transactions in the multiple transactions into a group of first-type transactions. In some examples, each of the network nodes further groups all second-type transactions in the multiple transactions into a group of second-type transactions. Continuing with the above example, the transactions shown in FIG. 3A may be divided into a group of first-type transactions such as non-smart-contract transactions and a group of second-type transactions such as smart contract transactions. Referring to FIG. 3B, the transactions may be divided into the group 320 that includes all the first-type transactions and the group 330 that includes all the second-type transactions. As noted before, the first-type transaction, such as non-smart-contract transactions, can be executed in series or parallel with another first-type transaction. The second-type transaction, such as smart contract transactions can be executed only in series with another second-type transaction or a first-type transaction. Therefore, here, the process 400 of the specification is configured to sort out all the transactions that can be executed in parallel from the transactions that can only be executed in series with other transactions.

Referring back to FIG. 4, at 406, each of the network nodes divides the group of first-type transactions into one or more subgroups. As noted before, any two of the first-type transactions that affect one or more common entities cannot be executed in parallel because it will affect the execution result of the transactions. Therefore, such first-type transactions affecting a common transaction entity by execution of the transactions may need to be executed in series. Accordingly, the group of first-type transactions as determined at 404 are further divided into one or more subgroup based on the one or more common transaction entities associated with each of the subgroups. In this way, any first-type transaction in any subgroup does not affect any common transaction entity of any first-type transaction in any other subgroup of the group of first-type transactions, and the first-type transactions within a subgroup can be executed in series, while the multiple subgroups can be executed in parallel.

For example, referring to FIG. 3B, the group 320 of first-type transactions are divided into four subgroups 340a-d. Each of the subgroups 340a-d is associated with one or more respective common transaction entities. In some embodiments, the common transaction entity includes a transferee (or a transferee's account) or a transferor (or a transferor's account). For example, each of the first transactions 302a-d in the subgroup 340a may be associated with a first common account. Each of the first transactions 304a-c in the subgroup 340b may be associated with a second common account. Each of the first transactions 306a-c in the subgroup 340c may be associated with a third common account. Each of the first transactions 310a-b in the subgroup 340d may be associated with a fourth common account. Note that between any two different subgroups of the group of first-type transactions, any first-type transaction in one subgroup does not affect any common transaction entity with any first-type transaction in another subgroup.

Referring back to FIG. 4, at 408, each of the network nodes executes the group of first-type transactions by executing the one or more subgroups of the group of the first-type transactions in parallel. For example, a multi-processor or multi-core network node may execute multiple subgroups of the group of first-type transactions in parallel, with each of the processors or cores of the network node executing one of the multiple subgroups. In some embodiments, the first-type transactions within each of the subgroups that affect a common transaction entity are executed in series. For example, referring to FIG. 3B, the four subgroups 340a-d are executed by each of the network nodes in parallel, and the transactions within each of the subgroups are executed in series.

In some embodiments, the first-type transactions within each of the subgroups 340a-d are executed by the network nodes in a same order as the original execution order, such as a serial order in which the respective first-type transactions appear in the execution order 300. For example, in the execution order 300, the first-type transactions 302a-d in the subgroup 304a are executed in a serial order of 302a, 302b, 302c, and 302d, among other transactions. In the parallel execution order 350, the first-type transactions 302a-d in the subgroup 304a are executed in the same serial order of 302a, 302b, 302c, and 302d as they are executed in the execution order 300.

In alternative embodiments, the first-type transactions within each of the subgroups 340a-d are executed by the network nodes in an execution order that is different from the original execution order, such as a serial order in which the respective first-type transactions appear in the execution order 300. For example, in the execution order 300, the first-type transactions 302a-d in the subgroup 304a are executed in a serial order of 302a, 302b, 302c, and 302d, among other transactions. In another parallel execution order that includes a minor alteration of the execution order 350, the first-type transactions 302a-d in the subgroup 304a may be executed in an execution order of 302c, 302b, 302d, and 302a. In such case, as long as that every network node of the blockchain network executes the transactions within each of the subgroups in a same execution order (e.g., each network node executes the first-type transactions 302a-d in the subgroup 304a in the same execution order of 302c, 302b, 302d, and 302a), a consistent execution result among the network nodes of the blockchain network can be obtained.

Referring back to FIG. 4, at 410, each of the network nodes executes the group of second-type transactions in series with the group of first-type transactions. In some embodiments, the network nodes execute the group of second-type transactions prior to executing the group of first-type transactions. In alternative embodiments, the network nodes execute the group of second-type transactions after executing the group of first-type transactions. Whichever the execution order is, the group of first-type transactions and the group of second-type transactions need to be executed by each of the network nodes in a same execution order.

In some embodiments, the group of second-type transactions need not be executed by the network nodes consecutively. For example, the group of second-type transactions may be executed by the network nodes in a discrete manner. Referring to FIG. 3B, the group 320 of first-type transactions may be executed in between executing the second-type transactions 308a and 308b. For example, the second-type transaction 308a may be executed before executing the group 320 of first-type transactions and the second-type transaction 308b may be executed after executing the group 320 of first-type transactions.

The second-type transactions within the group of second-type transactions are executed by the network nodes in series. In some embodiments, the transactions within the group of second-type transactions are executed by the network nodes in a same order as the original execution order, such as the execution order 300, in which they will be executed by the network nodes in the multiple transactions. For example, in the execution order 300, the second-type transactions 308a and 308b are executed in a serial order of 308a and 308b, among other transactions. In the parallel execution order 350, the second-type transactions 308a and 308b in the group 330 are executed in the same serial order of 308a and 308b as they are executed in the execution order 300.

In alternative embodiments, the second-type transactions within the group of second-type transactions are executed by the network nodes in an execution order that is different from the original execution order (i.e., an order of the second-type transactions in the multiple transactions), such as a serial order in which the respective second-type transactions appear in the execution order 300. For example, in the execution order 300, the second-type transactions 308a and 308b are executed in a serial order of 308a and 308b, among other transactions. In another parallel execution order that includes a minor alteration of the execution order 350, the second-type transactions 308a and 308b may be executed in an execution order of 308b and 308a. In such case, as long as every network node of the blockchain network executes the transactions within the group of second-type transactions in a same execution order, a consistent execution result among the network nodes of the blockchain network can be obtained.

Figure 5:
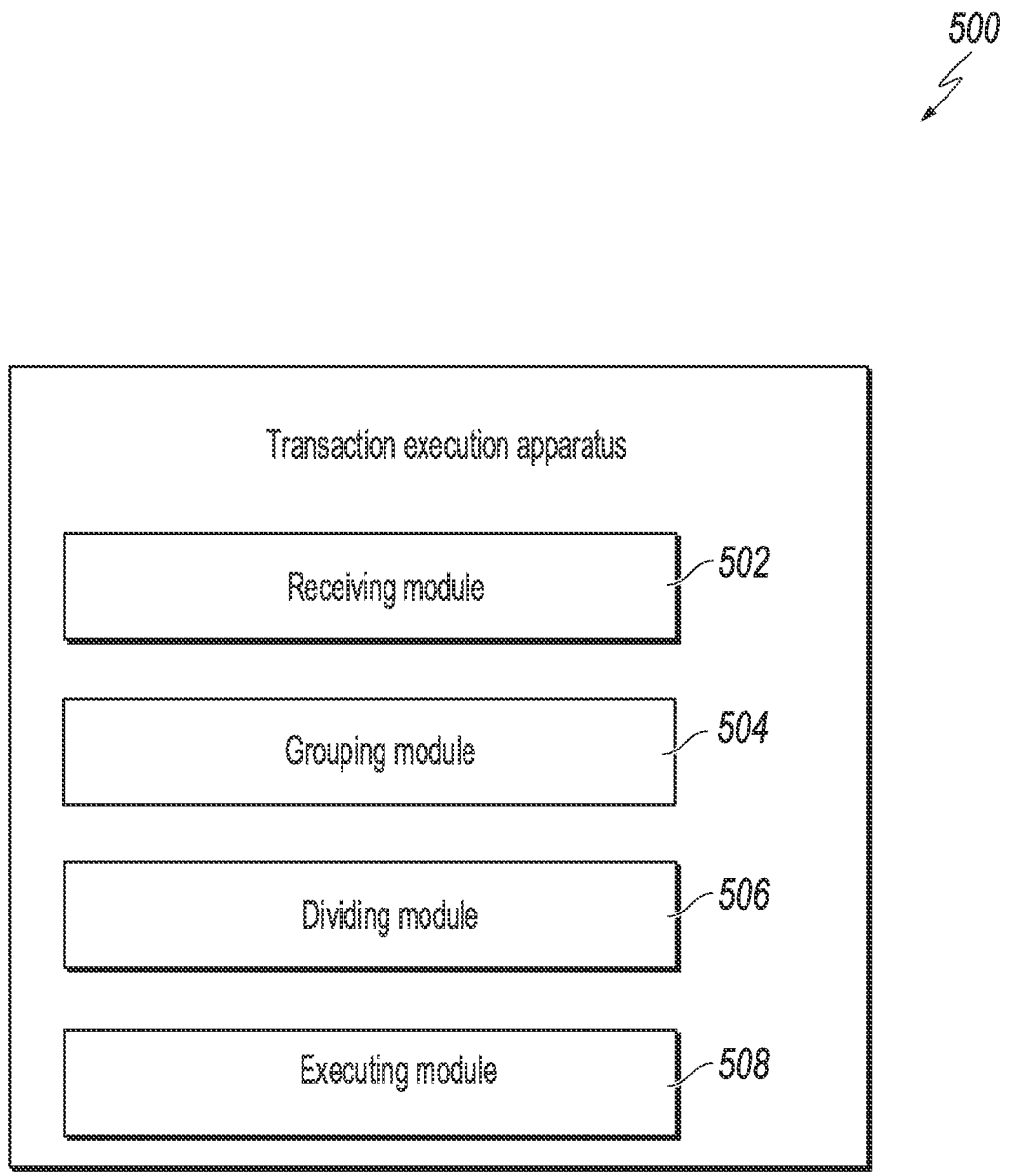
FIG. 5 depicts examples of modules of an apparatus in accordance with embodiments of the specification.

FIG. 5 is a diagram of an example of modules of an apparatus 500 in accordance with embodiments of this specification. The apparatus 500 can be an example embodiment of a blockchain network node configured to perform parallel execution of transactions, wherein the blockchain network is a consortium blockchain network. The apparatus 500 can correspond to the embodiments described above, and the apparatus 500 includes the following: a receiver or a receiving module 502 for receiving multiple transactions, wherein each of the multiple transactions includes a first-type transaction or a second-type transaction; a grouping module 504 for grouping all first-type transactions in the multiple transactions into a group of first-type transactions; a divider or dividing module 506 for dividing the group of first-type transactions into one or more subgroups, wherein: each subgroup of the group of first-type transactions includes one or more first-type transactions that affect one or more common transaction entities by execution of the one or more first-type transactions; and any first-type transaction in any subgroup does not affect any common transaction entity of any first-type transaction in any other subgroup; and an execution module 508 for executing the group of first-type transactions by executing the one or more subgroups of the group of first-type transactions in parallel on the network node, wherein the one or more first-type transactions within each of the one or more subgroups are executed in series.

In an optional embodiment, the multiple transactions include a number of transactions on which a consensus process has been performed by the network nodes.

In an optional embodiment, the grouping module 504 further groups all second-type transactions in the multiple transactions into a group of second-type transactions, and the execution module 508 further executes the group of second-type transactions in series with the group of first-type transactions by the network node.

In an optional embodiment, the executing the group of second-type transactions includes executing the second-type transactions within the group of second-type transactions in series.

In an optional embodiment, the executing the group of second-type transactions includes executing second-type transactions within the group of second-type transactions in a different order from an order of the second-type transactions in the multiple transactions.

In an optional embodiment, the executing the group of second-type transactions in series with the group of first-type transactions includes executing the group of second-type transactions prior to executing the group of first-type transactions.

In an optional embodiment, the executing the group of second-type transactions in series with the group of first-type transactions includes executing the second-type transactions after executing the group of first-type transactions.

In an optional embodiment, a first-type transaction includes a non-smart-contract transaction and a second-type transaction includes a smart contract transaction.

In an optional embodiment, a first-type transaction is configured to be executed in parallel or series with another first-type transaction, and a second-type transaction is configured to be executed only in series with another second-type transaction or a first-type transaction.

In an optional embodiment, the one or more common transaction entities includes one or more of a transferee, a transferor, an account of the transferee, or an account of the transferor associated with a first-type transaction in each subgroup.

In an optional embodiment, the multiple transactions are executed by the network node in a same order as an order in which the multiple transactions are executed by any other network node of the multiple network nodes of the blockchain network.

In an optional embodiment, the apparatus 500 further includes the following: a determining module for determining, according to a protocol used by the multiple network nodes of the blockchain network, a serial order of executing the one or more first-type transactions within each of the one or more subgroup, a serial order of executing the group of second-type transactions, and whether to execute the group of first-type transactions before or after executing the group of second-type transactions.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as units may or may not be physical units, may be located in one position, or may be distributed on multiple network units. Some or all of the modules can be selected based on actual demands to achieve the objectives of the solutions of the specification. A person of ordinary skill in the art can understand and implement the embodiments of the present application without creative efforts.

Referring again to FIG. 5, it can be interpreted as illustrating an internal functional module and a structure of a transaction execution apparatus. The transaction execution apparatus can be an example of a blockchain network node configured to perform parallel execution of transactions. An execution body in essence can be an electronic device, and the electronic device includes the following: one or more processors; and a memory configured to store an executable instruction of the one or more processors.

The one or more processors are configured to receive multiple transactions, wherein the multiple transactions includes multiple first-type transactions; group all first-type transactions in the multiple transactions into a group of first-type transactions; divide the group of first-type transactions into one or more subgroups, wherein: each subgroup of the group of first-type transactions includes one or more first-type transactions that affect one or more common transaction entities by execution of the one or more first-type transactions of the subgroup; and any first-type transaction in any subgroup does not affect any common transaction entity of any first-type transaction in any other subgroup; and execute the group of first-type transactions by executing the one or more subgroups of the group of first-type transactions in parallel on the network node, wherein the one or more first-type transactions within each of the one or more subgroups are executed in series.

Optionally, the multiple transactions include a number of transactions on which a consensus process has been performed by the one or more processors.

Optionally, the one or more processors are further configured to group all second-type transactions in the multiple transactions into a group of second-type transaction and execute the group of second-type transactions in series with the group of first-type transactions.

Optionally, the executing the group of second-type transactions includes executing the second-type transactions within the group of second-type transactions in series.

Optionally, the executing the group of second-type transactions includes executing the second-type transactions within the group of second-type transactions in a different order from an order of the second-type transactions in the multiple transactions.

Optionally, the executing the group of second-type transactions in series with the group of first-type transactions includes executing the second-type transactions prior to executing the group of first-type transactions.

Optionally, the executing the group of second-type transactions in series with the group of first-type transactions includes executing the group of second-type transactions after executing the group of first-type transactions.

Optionally, a first-type transaction includes a non-smart-contract transaction and a second-type transaction includes a smart contract transaction.

Optionally, a first-type transaction is configured to be executed in parallel or series with another first-type transaction, and a second-type transaction is configured to be executed only in series with another second-type transaction or a first-type transaction.

Optionally, the one or more common transaction entities includes one or more of a transferee, a transferor, an account of the transferee, or an account of the transferor associated with a first-type transaction in each subgroup.

Optionally, the multiple transactions are executed by the network node in a same order as an order in which the multiple transactions are executed by any other network node of the multiple network nodes of the blockchain network.

Optionally, the one or more processors are further configured to determine, according to a protocol used by the multiple network nodes of the blockchain network, a serial order of executing the one or more first-type transactions within each of the one or more subgroup, a serial order of executing the group of second-type transactions, and whether to execute the group of first-type transactions prior to or after executing the group of second-type transactions.

The techniques described in this specification produce several technical effects. For example, the specification discloses techniques that allow parallel execution of transactions by a network node in a distributed ledger system while guaranteeing the same execution order of the transactions performed by each network node of the distributed ledger system to ensure consistency of execution results of the transactions in the distributed ledger system. Specifically, transactions that can be executed in parallel are identified and grouped together and are further divided into multiple subgroups. Transactions are placed in different subgroups when the transactions have no common transaction entity or dependency on one another (e.g., do not affect the same accounts in the blockchain network). As a result of the way the groups and subgroups are generated, the execution order in which different subgroups of transactions are executed relative to one another does not affect the overall state of the blockchain network. Thus, these different subgroups of transactions can be executed in parallel with each other by a single network node, and still achieve a consistent global state of the blockchain across all network nodes within the blockchain network. The described techniques thus can improve the processing speed of the transactions and increase transaction throughput in a blockchain network. For example, by dividing the transactions into different groups after achieving a consensus and before executing the transactions, the multiple groups of transactions can be executed independently in parallel by taking advantage of a multi-processor or multi-core network node to increase the execution speed of the network node and the efficiency of the overall blockchain network.

Described embodiments of the subject matter can include one or more features, alone or in combination.

For example, in a first embodiment, a computer-implemented method for executing multiple transactions in a blockchain network includes the following actions: receiving multiple transactions by a network node of multiple network nodes, wherein each of the multiple transactions includes a first-type transaction or a second-type transaction; dividing the multiple transactions into a group of first-type transactions and a group of second-type transactions by the network node, wherein the group of first-type transactions include all first-type transactions in the multiple transactions; dividing the group of first-type transactions into two or more subgroups, wherein: each subgroup of the group of first-type transactions comprises one or more first-type transactions that each affect one or more common transaction entities of the first-type transactions of the subgroup; and between each two different subgroups of the group of first-type transactions, any first-type transaction in one subgroup does not affect any transaction entity of any first-type transaction of any other subgroup; and executing the group of first-type transactions by the network node by executing the one or more subgroups of the group of first-type transactions in parallel on the network node, wherein the one or more first-type transactions within each of the one or more subgroups are executed in series.

The foregoing and other described embodiments can each, optionally, include one or more of the following features:

A first feature, combinable with any of the following features, further including performing a consensus process on the plurality of transactions before dividing the plurality of transactions into the group of first-type transactions and the group of second-type transactions.

A second feature, combinable with any of the previous or following features, wherein the computer-implemented method further includes the following: executing the group of second-type transactions in series with the group of first-type transactions by the network node.

A third feature, combinable with any of the previous or following features, wherein the executing the group of second-type transactions includes executing the second-type transactions in series within the group of second-type transactions.

A fourth feature, combinable with any of the previous or following features, wherein the executing the group of second-type transactions includes executing the group of second-type transactions in a different order from an order of the second-type transactions in the multiple transactions.

A fifth feature, combinable with any of the previous or following features, wherein the executing the group of second-type transactions in series with the group of first-type transactions includes executing the group of second-type transactions before executing the group of first-type transactions.

A sixth feature, combinable with any of the previous or following features, wherein the executing the group of second-type transactions in series with the group of first-type transactions includes executing the group of second-type transactions after executing the group of first-type transactions.

A seventh feature, combinable with any of the previous or following features, wherein the multiple transactions do not need to be executed by the network node in a predetermined order.

An eighth feature, combinable with any of the previous or following features, wherein a transaction that is a non-smart-contract transaction is first-type transaction and a transaction that is a smart contract transaction is a second-type transaction.

A ninth feature, combinable with any of the previous or following features, wherein the first-type transaction is configured to be executed in parallel or series with another first-type transaction, and the second-type transaction is configured to be executed only in series with another second-type transaction or a first-type transaction.

A tenth feature, combinable with any of the previous or following features, wherein the one or more common transaction entities includes one or more of a transferee, a transferor, an account of the transferee, or an account of the transferor associated with a first-type transaction in each subgroup.

An eleventh feature, combinable with any of the previous or following features, wherein the multiple transactions are executed by the network node in a same order as the multiple transactions are executed by any other network node of the multiple network nodes of the blockchain network.

A twelfth feature, combinable with any of the previous features, wherein the computer-implemented further includes the following: according to a protocol used by the multiple network nodes of the blockchain network, determining a serial order of executing the one or more first-type transactions within each of the one or more subgroup, determining a serial order of executing the group of second-type transactions, and determining a serial order of executing the group of first-type transactions and executing the group of second-type transactions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network).

Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in serial order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or serial order, to achieve desirable results. In some cases, multitasking and parallel processing may be advantageous.

What is claimed is:

1. A computer-implemented method for executing a plurality of transactions in a blockchain network, wherein the blockchain network comprises a plurality of network nodes, the method comprising:
   receiving, by a network node of the plurality of network nodes, a plurality of transactions, wherein the plurality of transactions comprise a plurality of first-type transactions and a plurality of second-type transactions;
   grouping, by the network node, all first-type transactions in the plurality of transactions into a group of first-type transactions and all second-type transactions in the plurality of transactions into a group of second-type transactions;
   dividing, by the network node, the group of first-type transactions into one or more subgroups, wherein:
      each subgroup of the group of first-type transactions comprises one or more first-type transactions that affect one or more common transaction entities by execution of the one or more first-type transactions, and
      any first-type transaction in any subgroup does not affect any common transaction entity of any first-type transaction in any other subgroup;
   executing, by the network node, the group of first-type transactions by executing the one or more subgroups of the group of first-type transactions in parallel on the network node, wherein the one or more first-type transactions within each of the one or more subgroups are executed in series; and
   executing, by the network node, the group of second-type transactions in series with the group of first-type transactions according to a protocol used by the plurality of network nodes of the blockchain network comprising:
      determining a serial order of executing the one or more first-type transactions within each of the one or more subgroups;

determining a serial order of executing the second-type transactions within a group of second-type transactions; and determining whether to execute the group of first-type transactions before or after executing the group of second-type transactions.

2. The method of claim 1, wherein the plurality of transactions comprise a plurality of transactions on which a consensus process has been performed by the network node.

3. The method of claim 1, wherein the executing the group of second-type transactions comprises executing the second-type transactions within the group of second-type transactions in series.

4. The method of claim 1, wherein the executing the group of second-type transactions comprises executing the second-type transactions within the group of second-type transactions in a different order from an order of the second-type transactions in the plurality of transactions.

5. The method of claim 1, wherein the executing the group of second-type transactions in series with the group of first-type transactions comprises executing the group of second-type transactions prior to executing the group of first-type transactions.

6. The method of claim 1, wherein the executing the group of second-type transactions in series with the group of first-type transactions comprises executing the group of second-type transactions after executing the group of first-type transactions.

7. The method of claim 1, wherein a first-type transaction comprises a non-smart-contract transaction and a second-type transaction comprises a smart contract transaction.

8. The method of claim 1, wherein a first-type transaction is configured to be executed in parallel or series with another first-type transaction, and a second-type transaction is configured to be executed only in series with another second-type transaction or a first-type transaction.

9. The method of claim 1, wherein the one or more common transaction entities comprise one or more of a transferee, a transferor, an account of the transferee, or an account of the transferor associated with a first-type transaction in each subgroup.

10. The method of claim 1, wherein the plurality of transactions are executed by the network node in a same order as an order in which the plurality of transactions are executed by any other network node of the plurality of network nodes of the blockchain network.

11. A non-transitory, computer-readable storage medium storing one or more instructions executable by a computer system to perform operations for executing a plurality of transactions in a blockchain network, wherein the blockchain network comprises a plurality of network nodes, the operations comprising:

receiving, by a network node of the plurality of network nodes, a plurality of transactions, wherein the plurality of transactions comprise a plurality of first-type transactions and a plurality of second-type transactions;

grouping, by the network node, all first-type transactions in the plurality of transactions into a group of first-type transactions and all second-type transactions in the plurality of transactions into a group of second-type transactions;

dividing, by the network node, the group of first-type transactions into one or more subgroups, wherein:

each subgroup of the group of first-type transactions comprises one or more first-type transactions that affect one or more common transaction entities by execution of the one or more first-type transactions, and any first-type transaction in any subgroup does not affect any common transaction entity of any first-type transaction in any other subgroup;

executing, by the network node, the group of first-type transactions by executing the one or more subgroups of the group of first-type transactions in parallel on the network node, wherein the one or more first-type transactions within each of the one or more subgroups are executed in series; and executing, by the network node, the group of second-type transactions in series with the group of first-type transactions according to a protocol used by the plurality of network nodes of the blockchain network comprising:

determining a serial order of executing the one or more first-type transactions within each of the one or more subgroups;

determining a serial order of executing the second-type transactions within a group of second-type transactions; and determining whether to execute the group of first-type transactions before or after executing the group of second-type transactions.

12. The non-transitory, computer-readable storage medium of claim 11, wherein the plurality of transactions comprise a plurality of transactions on which a consensus process has been performed by the network node.

13. The non-transitory, computer-readable storage medium of claim 11, wherein the executing the group of second-type transactions comprises executing the second-type transactions within the group of second-type transactions in series.

14. The non-transitory, computer-readable storage medium of claim 11, wherein the executing the group of second-type transactions comprises executing the second-type transactions within the group of second-type transactions in a different order from an order of the second-type transactions in the plurality of transactions.

15. The non-transitory, computer-readable storage medium of claim 11, wherein the executing the group of second-type transactions in series with the group of first-type transactions comprises executing the group of second-type transactions prior to executing the group of first-type transactions.

16. The non-transitory, computer-readable storage medium of claim 11, wherein the executing the group of second-type transactions in series with the group of first-type transactions comprises executing the group of second-type transactions after executing the group of first-type transactions.

17. The non-transitory, computer-readable storage medium of claim 11, wherein a first-type transaction comprises a non-smart-contract transaction and a second-type transaction comprises a smart contract transaction.

18. The non-transitory, computer-readable storage medium of claim 11, wherein a first-type transaction is configured to be executed in parallel or series with another first-type transaction, and a second-type transaction is configured to be executed only in series with another second-type transaction or a first-type transaction.

19. The non-transitory, computer-readable storage medium of claim 11, wherein the one or more common transaction entities comprise one or more of a transferee, a transferor, an account of the transferee, or an account of the transferor associated with a first-type transaction in each subgroup.

20. The non-transitory, computer-readable storage medium of claim 11, wherein the plurality of transactions are executed by the network node in a same order as an order in which the plurality of transactions are executed by any other network node of the plurality of network nodes of the blockchain network.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a network node of a plurality of network nodes of a blockchain network, a plurality of transactions, wherein the plurality of transactions comprise a plurality of first-type transactions and a plurality of second-type transactions;
grouping, by the network node, all first-type transactions in the plurality of transactions into a group of first-type transactions and all second-type transactions in the plurality of transactions into a group of second-type transactions;
dividing, by the network node, the group of first-type transactions into one or more subgroups, wherein:
each subgroup of the group of first-type transactions comprises one or more first-type transactions that affect one or more common transaction entities by execution of the one or more first-type transactions, and
any first-type transaction in any subgroup does not affect any common transaction entity of any first-type transaction in any other subgroup;
executing, by the network node, the group of first-type transactions by executing the one or more subgroups of the group of first-type transactions in parallel on the network node, wherein the one or more first-type transactions within each of the one or more subgroups are executed in series; and
executing, by the network node, the group of second-type transactions in series with the group of first-type transactions according to a protocol used by the plurality of network nodes of the blockchain network comprising:
determining a serial order of executing the one or more first-type transactions within each of the one or more subgroups;
determining a serial order of executing the second-type transactions within a group of second-type transactions; and
determining whether to execute the group of first-type transactions before or after executing the group of second-type transactions.

22. The system of claim 21, wherein the plurality of transactions comprise a plurality of transactions on which a consensus process has been performed by the network node.

23. The system of claim 21, wherein the executing the group of second-type transactions comprises executing the second-type transactions within the group of second-type transactions in series.

24. The system of claim 21, wherein the executing the group of second-type transactions comprises executing the second-type transactions within the group of second-type transactions in a different order from an order of the second-type transactions in the plurality of transactions.

* * * * *

UNITED STATES PATENT AND TRADEMARK OFFICE
CERTIFICATE OF CORRECTION

PATENT NO. : 11,231,957 B2
APPLICATION NO. : 16/668937
DATED : January 25, 2022
INVENTOR(S) : Guilu Xie and Ning Xia Page 1 of 1

It is certified that error appears in the above-identified patent and that said Letters Patent is hereby corrected as shown below:

On the Title Page

Column 1 (Item (73) Assignee), Line 1, delete "Alibaba Group Holding Limited," and insert
-- Advanced New Technologies Co., Ltd., --

Signed and Sealed this
Twelfth Day of April, 2022

Drew Hirshfeld
*Performing the Functions and Duties of the
Under Secretary of Commerce for Intellectual Property and
Director of the United States Patent and Trademark Office*